United States Patent
Sugimoto

(10) Patent No.: US 9,292,088 B2
(45) Date of Patent: Mar. 22, 2016

(54) DISPLAY DEVICE, NON-TRANSITORY COMPUTER-READABLE RECORDING MEDIUM AND IMAGE PROCESSING APPARATUS

(71) Applicant: Konica Minolta, Inc., Chiyoda-ku (JP)

(72) Inventor: Yasuaki Sugimoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 111 days.

(21) Appl. No.: 14/449,623

(22) Filed: Aug. 1, 2014

(65) Prior Publication Data

US 2015/0043033 A1     Feb. 12, 2015

(30) Foreign Application Priority Data

Aug. 6, 2013 (JP) ................................. 2013-163424

(51) Int. Cl.
*G06F 3/042* (2006.01)
*G06F 3/01* (2006.01)
(Continued)

(52) U.S. Cl.
CPC ............. *G06F 3/013* (2013.01); *G11B 27/007* (2013.01); *G11B 27/105* (2013.01);
(Continued)

(58) Field of Classification Search
CPC ............... G06F 3/013; H04N 21/4223; H04N 21/4325; H04N 21/44008; H04N 21/44218; H04N 21/458; H04N 5/93; H04N 1/00129; H04N 1/00472; H04N 2201/0075; H04N 2201/0094; G11B 27/34; G11B 27/007; G11B 27/105
USPC .......... 345/156–158, 173, 175, 176; 715/702, 715/740; 178/18.01–19.04; 434/322–364; 315/149–150
See application file for complete search history.

(56) References Cited

U.S. PATENT DOCUMENTS

| 2006/0256133 A1* | 11/2006 | Rosenberg | G06Q 30/02 345/619 |
| 2015/0036999 A1* | 2/2015 | Batur | G06F 3/013 386/230 |
| 2015/0213725 A1* | 7/2015 | Huntley | A61B 5/168 345/156 |

FOREIGN PATENT DOCUMENTS

| JP | 2007-036846 A | 2/2007 |
| JP | 2009-288892 A | 12/2009 |

(Continued)

OTHER PUBLICATIONS

Notification of Reasons for Refusal issued in corresponding Japanese Patent Application No. 2013-163424 mailed May 26, 2015, and English translation thereof. (12 pages).

*Primary Examiner* — Kent Chang
*Assistant Examiner* — Nelson Rosario
(74) *Attorney, Agent, or Firm* — Buchanan Ingersoll & Rooney PC

(57) ABSTRACT

Disclosed is a display device including: a display unit; a gaze detection unit configured to detect the user's gaze; and a control unit configured to control a display of a series of images, wherein in case that the user removes the gaze while the series of images are sequentially displayed, the control unit obtains first information specifying a position of an image in the series of images, which is displayed when the user removes the gaze, and instructs the display unit to continue a dynamic display of the series of images, and then, in case that the user returns the gaze, the control unit makes a judgment as to whether the control unit executes a replay process from the position specified in the first information, and in case that the control unit judges that the control unit executes the replay process, the control unit executes the replay process.

11 Claims, 11 Drawing Sheets

(51) Int. Cl.
  *H04N 1/00* (2006.01)
  *G11B 27/00* (2006.01)
  *G11B 27/10* (2006.01)
(52) U.S. Cl.
  CPC ...... *H04N 1/00129* (2013.01); *H04N 1/00472* (2013.01); *H04N 2201/0075* (2013.01); *H04N 2201/0094* (2013.01)

(56) References Cited

FOREIGN PATENT DOCUMENTS

| | | |
|---|---|---|
| JP | 2011-254279 A | 12/2011 |
| JP | 2012-093767 A | 5/2012 |

* cited by examiner

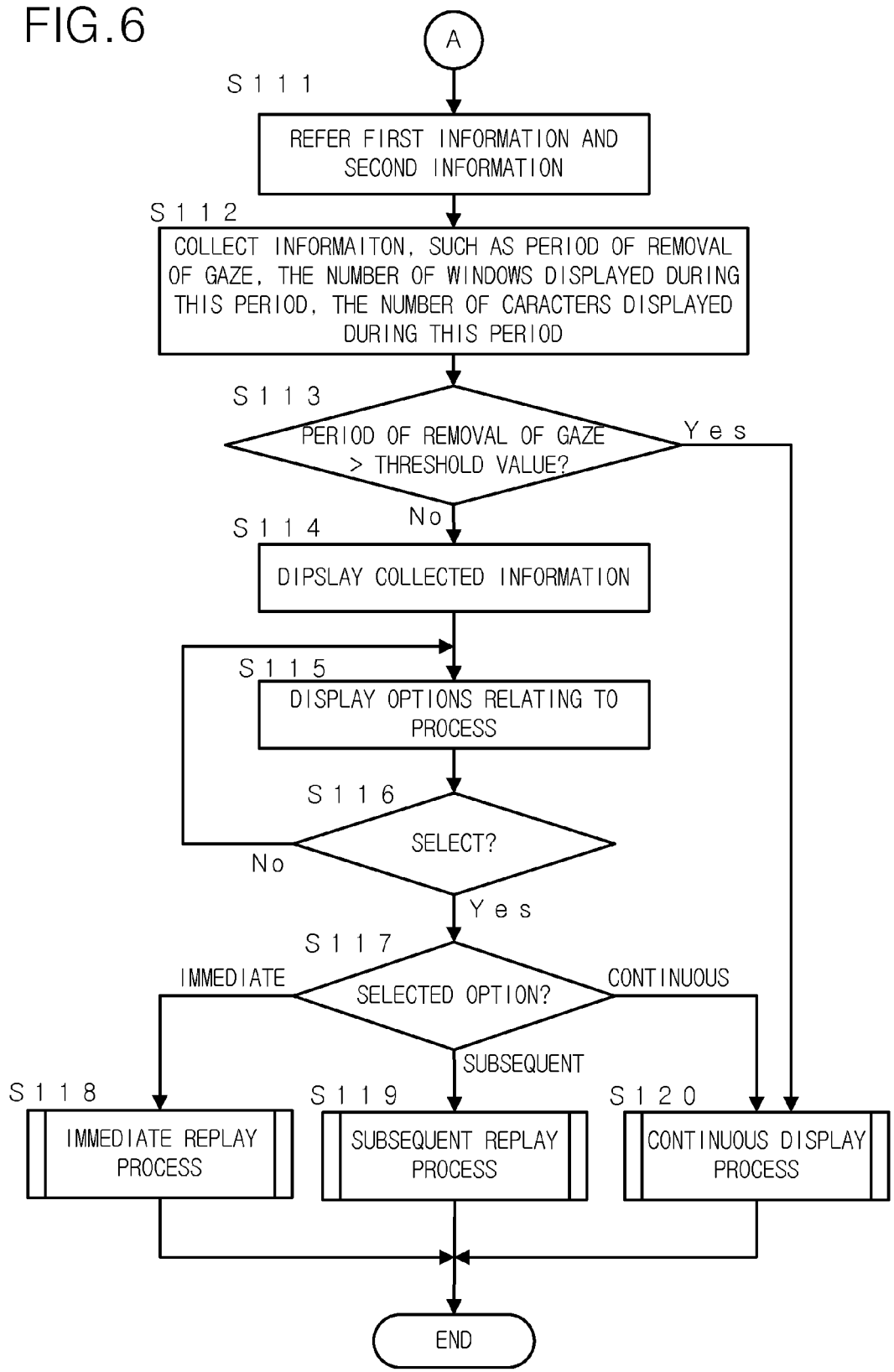

FIG.7

| | 70 |
|---|---|

THERE IS PERIDO IN WHICH YOU DO NOT VIEW WINDOWS DURING WINDOW TRANSITION

| TIME PERIOD IN WHICH YOU DO NOT VIEW WINDOWS | FEB. 8, 2013 12:27 | 30-37 SECONDS |
|---|---|---|
| THE NUMBER OF WINDOWS WHICH YOU DO NOT VIEW | | 14 WINDOWS |
| THE NUMBER OF IMAGES WHICH YOU DO NOT VIEW | | 70 IMAGES |
| THE NUMBER OF OPERATION BUTTONS WHICH YOU DO NOT VIEW | | 28 BUTTONS |
| THE NUMBER OF CHARACTERS (INCLUDING ALPHANUMERIC CHARACTERS) WHICH YOU DO NOT VIEW | | 420 CHARACTERS |

SELECT NEXT PROCESS AMONG FOLLOWING 3 OPTIONS

I. RETURN TO WINDOW WHICH IS DISPLAYED WHEN YOU DO NOT VIEW DISPLAY (12:27:30)

II. CONTINUE WINDOW TRANSITION/REPLAY OF VIDEO FROM CURRENT WINDOW (12:27:38)

III. CONTINUE WINDOW TRANSITION/REPLAY OF VIDEO FROM CURRENT WINDOW (12:27:38) AND SUBSEQUENTLY VIEW (REPLAY) WINDOWS (VIDEO) WHICH ARE DISPLAYED DURING PERIOD IN WHICH YOU DO NOT VIEW SCREEN

PREVIOUS    CANCEL

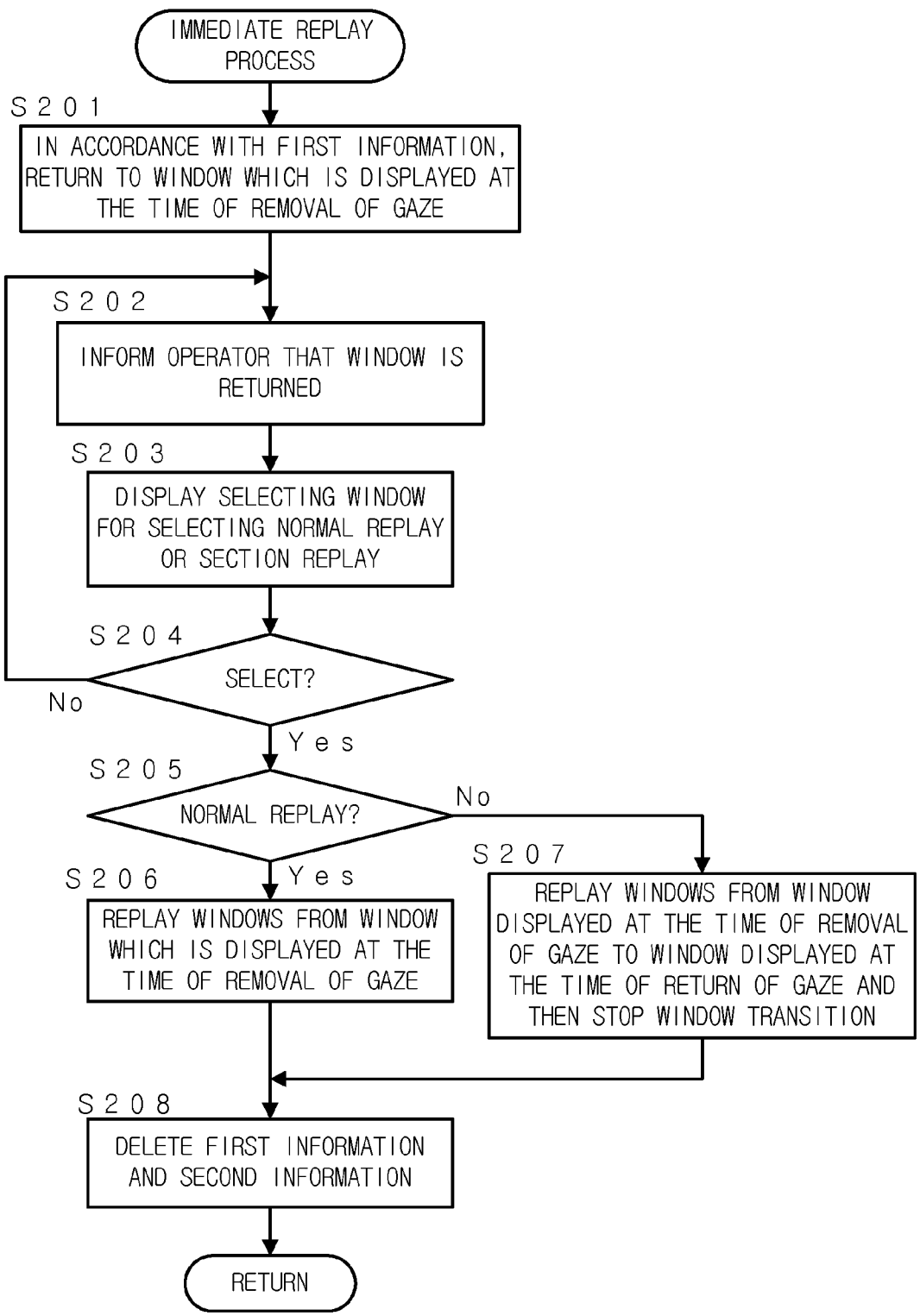

FIG.9

THERE IS PERIDO IN WHICH YOU DO NOT VIEW WINDOWS DURING WINDOW TRANSITION

| | | |
|---|---|---|
| TIME PERIOD IN WHICH YOU DO NOT VIEW WINDOWS | FEB. 8, 2013 12:27 | 30-37 SECONDS |
| THE NUMBER OF WINDOWS WHICH YOU DO NOT VIEW | | 14 WINDOWS |
| THE NUMBER OF IMAGES WHICH YOU DO NOT VIEW | | 70 IMAGES |
| THE NUMBER OF OPERATION BUTTONS WHICH YOU DO NOT VIEW | | 28 BUTTONS |
| THE NUMBER OF CHARACTERS (INCLUDING ALPHANUMERIC CHARACTERS) WHICH YOU DO NOT VIEW | | 420 CHARACTERS |

SELECT REPLAY PROCESS AMONG FOLLOWING 2 OPTIONS

IV. REPLAY WINDOWS FROM WINDOW WHICH IS DISPLAYED WHEN YOU DO NOT VIEW SCREEN (12:27:30)

V. EXECUTE SECTION REPLAY IN WHICH ONLY WINDOWS WHICH YOU DO NOT VIEW ARE REPLAYED (12:27:30-12:27:37)

PREVIOUS    CANCEL

DISPLAY DEVICE, NON-TRANSITORY COMPUTER-READABLE RECORDING MEDIUM AND IMAGE PROCESSING APPARATUS

BACKGROUND OF THE INVENTION

1. Field of the Invention

The present invention relates to a display device, a non-transitory computer-readable recording medium and an image processing apparatus, for executing a suitable process by detecting that a user removes user's gaze from a display unit during the window transition or the replay of a video.

2. Description of Related Art

In case that a user looks away for a short time during the successive window transition caused by a flick operation or the replay of a video, the user cannot recognize the windows or the replayed video (images) which are displayed while the user looks away.

The technology for detecting the user's gaze and for stopping the window transition or the like when the user's action in which the user removes the user's gaze from a display unit is detected, is disclosed (See Japanese Patent Application Publication No. 2012-93767). Further, the technology for cancelling the stop of the replay of the video or the like when the user returns the user's gaze to the display unit and restarting the replay of the video or the like, is disclosed (See Japanese Patent Application Publication No. 2007-36846).

There are two main types of causes to remove the user's gaze from the display unit during the window transition or the replay of the video.

<Cause 1> Because an unexpected accident is caused during the window transition or the replay of the video, the user inadvertently removes the user's gaze from the display unit.

In this case, the user wants to continuously view the display unit (or must continuously view the display unit). However, in consequence of various types of events which occur around, the user inadvertently removes the user's gaze from the display unit. For example, because the user hears something around, the user looks at the sound source. Because a person speaks to the user, the user looks at the person who speaks to the user. Because the phone rings, the user looks at the phone. Because a person passes close to the user, the user looks at the person.

<Cause 2> Because the user wants to only transit the windows, the user does not intend to view the transited windows or it is not necessary to view the transited windows.

For example, the user wants to change the window to the intended window by the flick operation and the user does not intend to always view the transited windows. In this case, because the user wants to only change (flow) the window, it is not necessary to continue viewing the display contents. It is only necessary to confirm the display contents occasionally.

The technologies disclosed in the above Japanese Patent Application Publications are suitable for the Cause 1, but are not suitable for the Cause 2. In case that the user removes the user's gaze due to the Cause 2, the window transition or the replay of the video is stopped despite the user's intention. Therefore, the above stop gives a great inconvenience to the user.

SUMMARY

To achieve at least one of the abovementioned objects, a display device reflecting one aspect of the present invention comprises:

a display unit;

a gaze detection unit configured to detect a gaze of a user who views the display unit; and a control unit configured to control a display of a series of images on the display unit, wherein in case that the gaze detection unit detects that the user who view the display unit removes the gaze from the display unit while the series of images are sequentially displayed on the display unit, the control unit obtains and stores first information specifying a position of an image in the series of images, which is displayed on the display unit when the gaze detection unit detects that the user removes the gaze, and instructs the display unit to continue a dynamic display of the series of images, and then, in case that the gaze detection unit detects that the user returns the gaze to the display unit, the control unit makes a judgment as to whether the control unit executes a replay process for sequentially displaying the series of images from the position which is specified in the first information, and in case that the control unit judges that the control unit executes the replay process, the control unit executes the replay process.

Preferably, the display device further comprises:

an operating unit configured to receive an operation from the user, wherein in case that a predetermined operation is received by the operating unit from the user, the control unit instructs the display unit to start the dynamic display of the series of images.

Preferably, the predetermined operation includes an operation for instructing a window transition in case that the series of images are a plurality of windows to be transited in a fixed transit order, an operation for instructing an update of windows, and an operation for instructing a replay of a video in case that the series of images are the video.

Preferably, the control unit obtains and stores second information specifying a position of an image in the series of images, which is displayed on the display unit when the gaze detection unit detects that the user returns the gaze to the display unit, and in the replay process, the control unit instructs the display unit to sequentially display only a section between the position specified in the first information and the position specified in the second information in the series of images.

Preferably, the control unit makes the judgment in accordance with a period which elapses since the gaze detection unit detects that the user who views the display unit removes the gaze from the display unit until the gaze detection unit detects that the user returns the gaze to the display unit while the series of images are sequentially displayed.

Preferably, the first information is at least one type of information among:

information which specifies the image displayed on the display unit when the user removes the gaze from the display unit;

information which specifies an object viewed by the user in the image which is displayed on the display unit just before the user removes the gaze from the display unit;

information which specifies a sound output with the image displayed on the display unit when the user removes the gaze from the display unit; and time information which specifies time period elapsing since the dynamic display of the series of images is started until the user removes the gaze from the display unit.

Preferably, the second information is at least one type of information among:

information which specifies the image displayed on the display unit when the user returns the gaze to the display unit;

information which specifies an object viewed by the user in the image which is displayed on the display unit when the user returns the gaze to the display unit;

information which specifies a sound output with the image displayed on the display unit when the user returns the gaze to the display unit; and time information which specifies time period elapsing since the dynamic display of the series of images is started or since the user removes the gaze from the display unit until the user returns the gaze to the display unit.

Preferably, the control unit makes the judgment in accordance with user's selection, and as options for the user's selection, the control unit provides at least two options among a first option for immediately executing the replay process, a second option for continuing a current display process and for subsequently executing the replay process, and a third option for continuing the current display process without executing the replay process.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIGS. 5 and 6 are a flowchart showing the main process carried out by the image processing apparatus when a series of the images are sequentially displayed;

FIG. 7 is a plan view showing an example of the process selecting window;

FIG. 8 is a flowchart showing the detail of the immediate replay process (Step S118 in FIG. 6);

FIG. 9 is a plan view showing an example of the replay type selecting window;

DETAILED DESCRIPTION OF PREFERRED EMBODIMENTS

Hereinafter, a preferred embodiment of the present invention will be explained with reference to the accompanying drawings.

Figure 1:
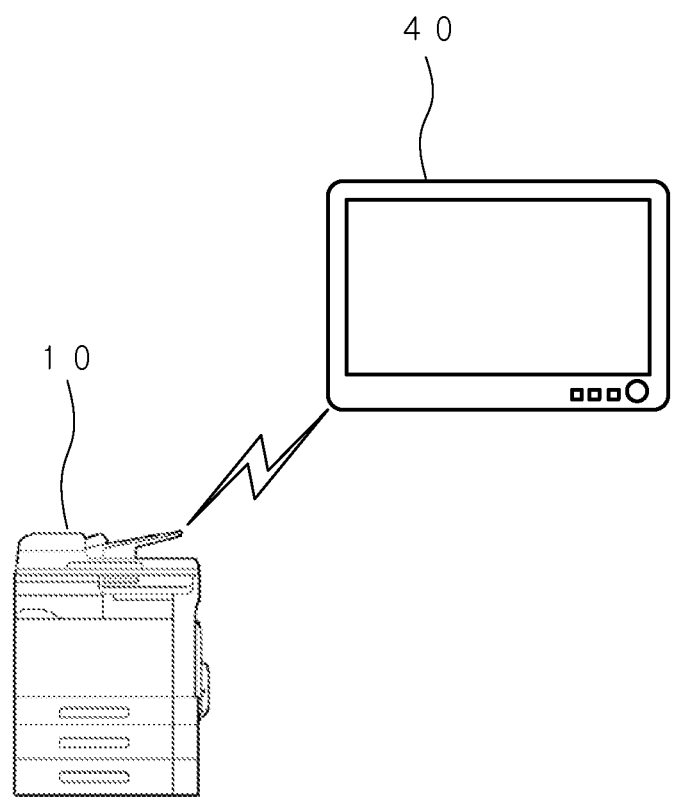
FIG. 1 is a view showing the image processing apparatus according to the embodiment and the operation display device for remotely controlling the image processing apparatus.

FIG. 1 shows the image processing apparatus 10 according to the embodiment and the operation display device 40 for remotely controlling the image processing apparatus 10. The operation display device 40 which is one aspect of the display device is connected with the image processing apparatus 10 via a network, such as LAN (Local Area Network) or the like, so as to be communicable with the image processing apparatus 10. The image processing apparatus 10 may be connected with the operation display device 40 by one of the wireless communication and the cable communication. However, the wireless communication is preferable to the cable communication.

The image processing apparatus 10 is a so-called multi-function peripheral (MFP) having the copy function for printing an image on recording paper by optically reading an original, the scan function for obtaining image data by reading an original to store the image data as a file or to transmit the image data to an external terminal via a network, the printer function for printing out an image by forming the image on the recording paper in accordance with the print data received from a PC (Personal Computer) or the like via the network, the facsimile function for transmitting and receiving the image data in accordance with the facsimile protocol, and the like.

Each of the image processing apparatus 10 and the operation display device 40 has a function for detecting the gaze of the operator (the user) who views the display unit and operates the apparatus or the device. Each of the image processing apparatus 10 and the operation display device 40 has a plurality of processes to be executed in case that the user removes the user's gaze from the display unit while a series of the images are sequentially displayed (while the dynamic display of a series of the images are carried out), and has the function for selectively executing one of the above processes.

A series of the images include a video, a plurality of images or windows which are transited in the fixed transit order, and the like. The term "a series of the images are sequentially displayed" means that a video is replayed, that a plurality of images or windows are sequentially displayed in the fixed transit order, that windows are sequentially updated in a predetermined order, or the like.

Figure 2:
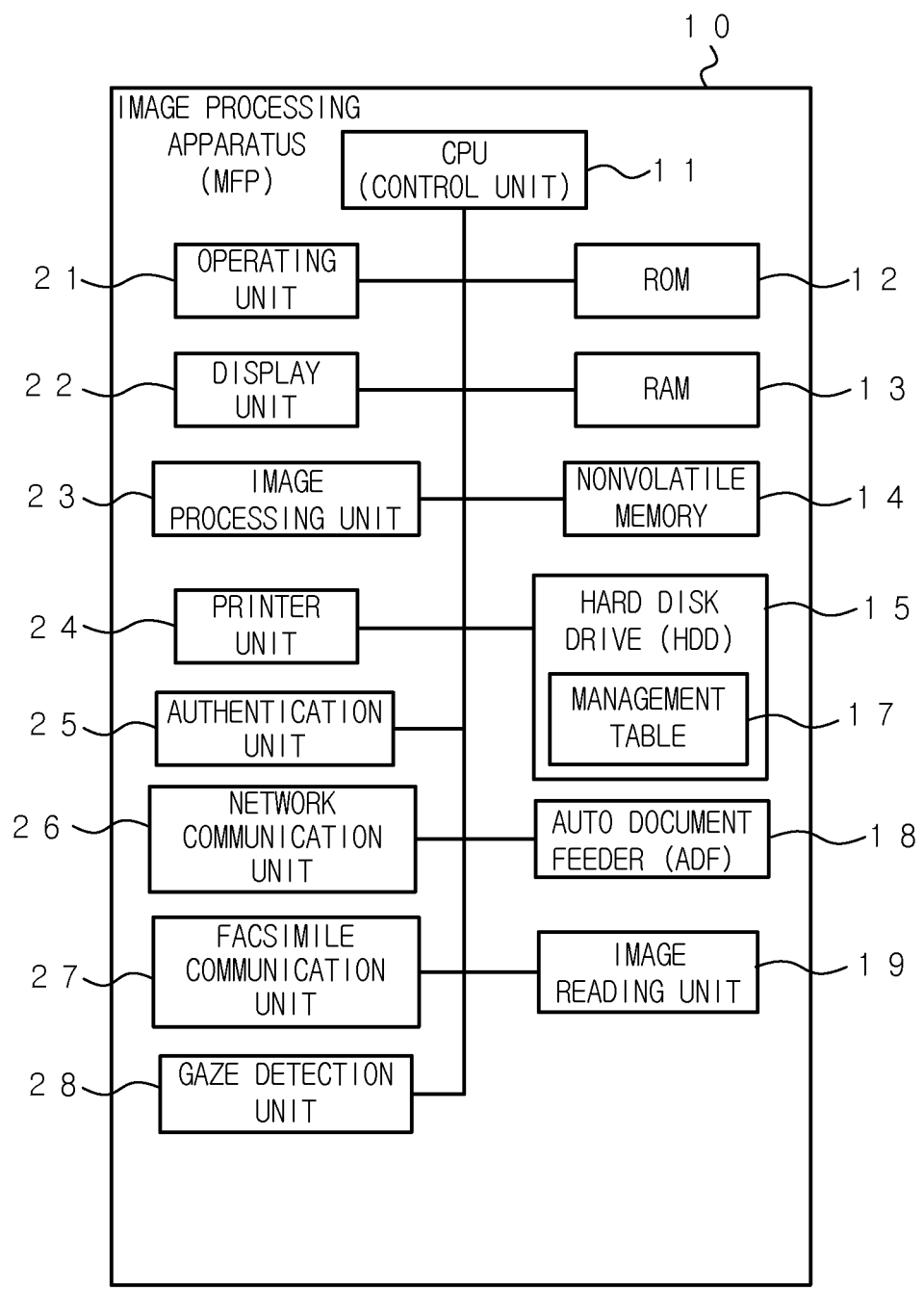
FIG. 2 is a block diagram showing the schematic configuration of the image processing apparatus.

FIG. 2 is a block diagram showing the schematic configuration of the image processing apparatus 10. The image processing apparatus 10 comprises a CPU (Central Processing Unit) 11 as a control unit for entirely controlling the operation of the image processing apparatus 10. The CPU 11 is connected with a ROM (Read Only Memory) 12, a RAM (Random Access Memory) 13, a nonvolatile memory 14, a hard disk drive 15, an auto document feeder (ADF) 18, an image reading unit 19, an operating unit 21, a display unit 22, an image processing unit 23, a printer unit 24, an authentication unit 25, a network communication unit 26, a facsimile communication unit 27, a gaze detection unit 28 and the like, via a bus.

By the CPU 11, a middleware, application programs and the like are executed on an OS (Operating System) program as a base. Further, the CPU 11 has a function as the control unit for controlling the display of a series of the images on the display unit 22. In the ROM 12, various types of programs are stored. By executing various types of processes by the CPU 11 in accordance with these programs, each function of the image processing apparatus 10 is realized.

The RAM 13 is used as a work memory for temporarily storing various types of data when the CPU 11 executes the process in accordance with the programs, and as an image memory for storing image data, and the like.

The nonvolatile memory 14 is a memory (flash memory) in which the stored contents are not damaged even if the image processing apparatus 10 is turned off, and is used for storing various setting information, and the like.

The hard disk drive 15 is a large-capacity nonvolatile storing device. In the hard disk drive 15, various types of programs and data are stored in addition to print data, data relating to windows and video to be displayed. In the hard disk drive 15, a management table 17 for storing the first information and the second information so as to relate the first and the second information, which will be explained below, is prepared and stored.

The image reading unit 19 has a function for optionally reading an original to obtain the image data. For example, the image reading unit 19 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The auto document feeder 18 has a function for conveying the original by feeding the original set to the original setting tray from the top sheet one by one, to pass the original through the reading position of the image reading unit 19 and to discharge the original to a predetermined discharge position. The image reading unit 19 has a function for reading the original disposed on the platen glass and a function for sequentially reading the original conveyed by the auto document feeder 18.

The display unit 22 has a function for displaying various types of operation windows, setting windows, a series of the images which is explained above, and the like. The display unit 22 comprises a liquid crystal display (LCD) and a driver thereof. The operating unit 21 has a function for receiving various types of operations, such as input of a job, from a user. The operating unit 21 comprises various types of hardware switches, such as a start button, and a touch panel provided on the display screen of the display unit 22. The touch panel detects the coordinate position on which the display screen of the display unit 22 is contacted by a touch pen, the user's finger or the like to operate the image processing apparatus 10. The operating unit 21 receives the flick operation, the drag operation or the like via the touch panel. The CPU 11 instructs the display unit 22 to start the dynamic display of a series of the images in case that the starting instruction (the predetermined operation) which will be explained below is received by the operating unit 21 from a user.

The image processing unit 23 carries out the rasterization processing for converting print data into image data, the compression/decompression processing for image data and the like, in addition to the processings, such as enlargement/reduction and rotation of the image.

The printer unit 24 has a function for forming an image on the recording paper in accordance with the image data. In this embodiment, the printer unit 24 is configured as a so-called laser printer which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by another type of printer.

The authentication unit 25 authenticates a user who uses the image processing apparatus 10. The authenticating method may be an optional method, and in the method, a password, a fingerprint, a vein or the like may be used.

The network communication unit 26 has a function for communicating with the operation display device 40, an external PC, a server or the like. The network communication unit 26 can carry out both the wireless communication and the cable communication. Alternatively, the network communication unit 26 may carry out only one of the wireless communication and the cable communication.

The facsimile communication unit 27 has a function for transmitting and receiving the image data to/from an external device having the facsimile function via a telephone line.

The gaze detection unit 28 detects the gaze of the operator (user) who views the display unit 22 of the image processing apparatus 10. The gaze detecting method may be an optional method. For example, a camera is provided at the middle portion of the upper edge of the display unit 22, and the image obtained by the camera is analyzed to detect the user's gaze from the direction of the user's face, the position of the pupil in the user's eye, and the like. The image processing apparatus 10 can recognize whether the operator views the display unit 22 or not, by detecting the operator's gaze with the gaze detection unit 28. Further, in case that the operator views the display unit 28, the image processing apparatus 10 can recognize the portion of the screen, which is viewed by the operator.

In the image processing apparatus 10, at least the CPU 11, the display unit 22 and the gaze detection unit 28 constitutes the display device. Preferably, the display device comprises the operating unit 21.

Figure 3:
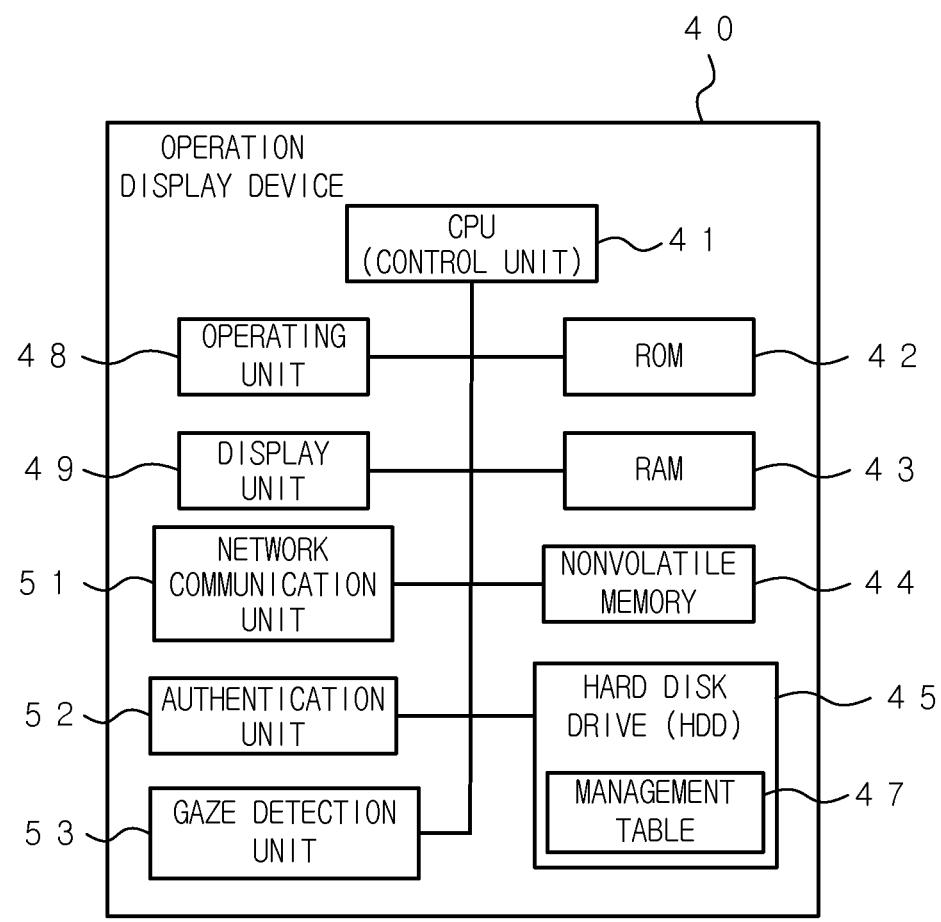
FIG. 3 is a block diagram showing the schematic configuration of the operation display device.

FIG. 3 is a block diagram showing the schematic configuration of the operation display device 40. The operation display device 40 comprises a CPU 41 for entirely controlling the operation of the operation display device 40. The CPU 41 is connected with a ROM 42, a RAM 43, a nonvolatile memory 44, a hard disk drive 45, an operating unit 48, a display unit 49, a network communication unit 51, an authentication unit 52, a gaze detection unit 53 and the like, via a bus.

By the CPU 41, a middleware, application programs and the like are executed on an OS (Operating System) program as a base. Further, the CPU 41 has a function as the control unit for controlling the display of a series of the images on the display unit 49. In the ROM 42, various types of programs are stored. By executing various types of processes by the CPU 41 in accordance with these programs, each function of the operation display device 40 is realized.

The RAM 43 is used as a work memory for temporarily storing various types of data when the CPU 41 executes the process in accordance with the programs, and for storing the data for displaying the contents.

The nonvolatile memory 44 is a memory (flash memory) in which the stored contents are not damaged even if the operation display device 40 is turned off, and is used for storing various setting information, and the like.

The hard disk drive 45 is a large-capacity nonvolatile storing device. In the hard disk drive 45, various types of programs and data are stored in addition to data relating to windows and video to be displayed. In the hard disk drive 45, a management table 47 for storing the first information and the second information so as to relate the first and the second information, which will be explained below, is prepared and stored.

The display unit 49 has a function for displaying various types of operation windows, setting windows, a series of the images which are explained above, and the like. The display unit 49 comprises a liquid crystal display (LCD) and a driver thereof. The operating unit 48 has a function for receiving various types of operations, such as input of a job, from an operator (a user). The operating unit 48 comprises various types of hardware switches, such as a start button, and a touch panel provided on the display screen of the display unit 49. The touch panel detects the coordinate position on which the display screen of the display unit 49 is contacted by a touch pen, the user's finger or the like to operate the operation display device 40. The operating unit 48 receives the flick operation, the drag operation or the like via the touch panel. The CPU 41 instructs the display unit 49 to start the dynamic display of a series of the images in case that the starting instruction (the predetermined operation) is received by the operating unit 48 from an operator.

The network communication unit 51 has a function for communicating with the image processing apparatus 10, an external PC, a server or the like. The network communication unit 51 can carry out both the wireless communication and the cable communication. Alternatively, the network communication unit 51 may carry out only one of the wireless communication and the cable communication.

The authentication unit 52 authenticates the operator who uses the operation display device 40. The operator is authenticated by using an ID (Identification) card or a fingerprint, or by checking a user ID (Identification) with a password, or the like.

The gaze detection unit 53 detects the gaze of the operator (user) who views the display unit 49 of the operation display device 40. Like the gaze detection unit 28, the gaze detecting method may be an optional method. The operation display device 40 can recognize whether the operator views the display unit 49 or not, by detecting the operator's gaze with the gaze detection unit 53. Further, in case that the operator views the display unit 49, the operation display device 40 can recognize the portion of the screen, which is viewed by the operator.

Next, the operation for sequentially displaying a series of the images on the display unit 22 of the image processing apparatus 10, will be explained. The image processing apparatus 10 and the operation display device 40 carry out the same operation relating to the sequential display of a series of the images. Therefore, in this embodiment, the operation of the image processing apparatus 10 will be explained and the explanation of the operation of the operation display device 40 is omitted.

Figure 4:
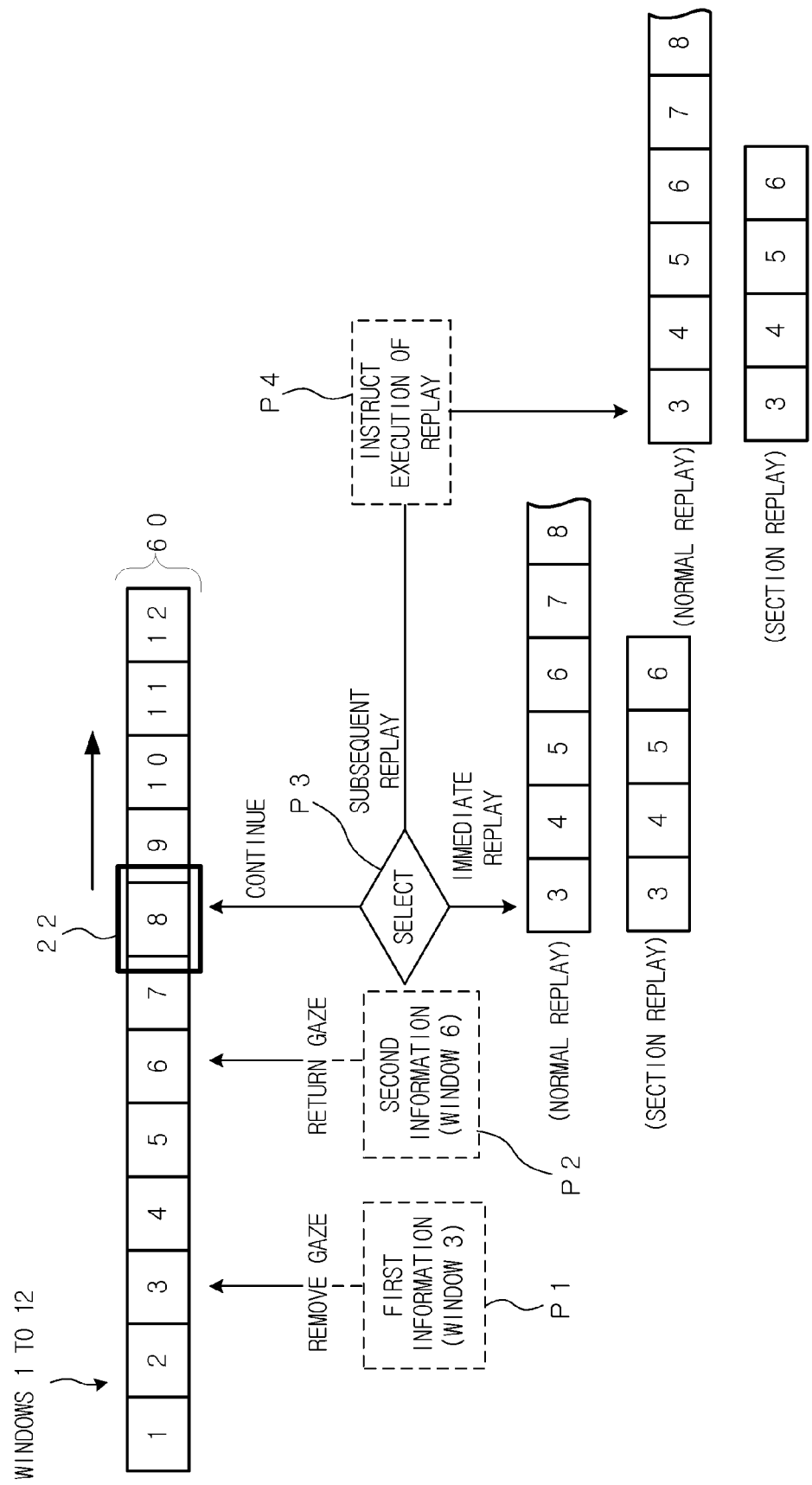
FIG. 4 is an explanatory view showing the summary of the operation of the image processing apparatus in case that the user removes the user's gaze from the display unit and returns the user's gaze to the display unit while a series of the images are sequentially displayed.

In this example, the case in which a series of the images are a plurality of setting windows to be transited in the fixed transit order, will be explained. As shown in FIG. 4, the image processing apparatus 10 manages a plurality of setting windows (in this example, the window (1) to the window (12)) as a series of the images 60 which are arranged in a row in the fixed transit order (the order of the window number). In the state in which the windows are statically displayed, one window and a part of each of the windows adjacent to the one window are displayed on the display unit 22. In the example of FIG. 4, the window (8), a part of the left adjacent window (7) and a part of the right adjacent window (9) are displayed on the display unit 22.

When the image processing apparatus 10 receives the flick operation in one direction of right and left directions via the touch panel (operating unit 21) provided on the screen of the display unit 22, a series of the images 60 are sequentially displayed so as to flow (scroll) the windows in the direction of the flick operation, on the display screen of the display unit 22. That is, the dynamic display of a series of the images is started. For example, when the flick operation is received in the left direction in the state in which the window (8) is statically displayed on the display unit 22, a series of the images 60 are displayed on the display screen of the display unit 22 so as to flow the windows in the left direction. That is, the windows are displayed on the display unit 22 so as to transit the window (8), the window (9), the window (10), the window (11), . . . , in order in the right direction.

The image processing apparatus 10 monitors whether the operator removes the operator's gaze from the display unit 22 while a series of the images 60 are sequentially displayed (scrolled) by receiving the flick operation. Then, in case that the gaze detection unit 28 detects that the operator removes the operator's gaze from the display unit 22 while a series of the images 60 are sequentially displayed, the CPU 11 obtains and stores the first information specifying the position of the image in a series of the images 60, which is displayed on the display unit 22 when the operator's gaze is removed (when the gaze detection unit 28 detects that the operator removes the operator's gaze) (the above position is referred to as the replay position), and continues the sequential display (the dynamic display) of a series of the images 60.

Then, the CPU 11 of the image processing apparatus 10 obtains and stores the second information specifying the replay position at the time that the gaze detection unit 28 detects that the operator returns the operator's gaze to the display unit 22. The operator selects one option among a plurality of the following options, and the CPU 11 executes the display operation continuously.

First option (immediate replay): The replay process for sequentially displaying a series of the images 60 by returning a series of the images 60 to the replay position specified in the first information, is immediately executed.

Second option (continuous display): The current display process is continued.

Third option (subsequent replay): The replay process for sequentially displaying a series of the images 60 by returning a series of the images 60 to the replay position specified in the first information, is subsequently executed.

That is, the CPU 11 judges whether the replay process is executed or not in accordance with the option selected by the operator, and in case that the execution of the replay process is judged, the CPU 11 executes the replay process.

As the type of replay process, the image processing apparatus 10 has the function of the normal replay for sequentially displaying a series of the images 60 from the replay position specified in the first information, and the function of the section replay for sequentially displaying only the section between the replay position specified in the first information and the replay position specified in the second information and then stopping the window transition. The image processing apparatus 10 receives the selection of the above types of replay process from the user.

The first option (immediate replay) and the third option (subsequent replay) are display processes which are suitable for the case in which the cause to remove the user's gaze from the display unit 22 is the above-described Cause 1, that is, the case in which the user inadvertently removes the user's gaze from the display unit 22 because an unexpected accident is caused.

The second option (continuous display) is a display process which is suitable for the case in which the cause to remove the user's gaze from the display unit 22 is the above-described Cause 2, that is, the case in which the user does not intend to view the transited windows or it is not necessary to view the transited windows because the user wants to only transit the windows.

The specific examples are explained. For example, in the state in which the window (1) shown in FIG. 4 is statically displayed, the image processing apparatus 10 receives the flick operation in the left direction and a series of the images 60 are sequentially displayed by scrolling the images 60 in the direction of the window (12). Then, when the window (3) is displayed on the display unit 22, the operator removes the operator's gaze from the display unit 22. In this case, the CPU 11 stores the information specifying the window (3) which is displayed on the display unit 22 when the operator removes the operator's gaze from the display unit 22, as the first information (P1 in FIG. 4). For example, the window number of the window (3) is stored as the first information.

After the operator's gaze is removed, the CPU 11 of the image processing apparatus 10 instructs the display unit 22 to continue the sequence display (scroll display) of a series of the images 60.

Then, when the window (6) is displayed on the display unit 22, the operator returns the operator's gaze to the display unit 22. At this time, the CPU 11 stores the information specifying the window (6) which is displayed on the display unit 22 when the operator returns the operator's gaze to the display unit 22, as the second information (P2). The CPU 11 provides the first option, the second option and the third option which are described above, for the operator by instructing the display unit 22 to display the process selecting window 70 (See FIG. 7) for receiving the selection for the above options. The image processing apparatus 10 receives the selection operation for selecting one option, from the operator (P3). In accordance with the above selection operation, the CPU 11 judges whether the replay process (immediate replay or the subsequent replay) is executed or not.

In case that the first option (immediate replay) is selected, the CPU 11 instructs the display unit 22 to display the replay type selecting window 80 (See FIG. 9) for receiving the selection for selecting one type between the normal replay and the section replay. The image processing apparatus 10 receives the selection for selecting one type, from the operator. In case that the selection of the normal replay is received, the CPU 11 executes the sequential display of a series of the images 60 from the window (3), and instructs the display unit 22 to continue the sequential display even though the window (6) is transited. In this example, the CPU 11 indicates the display unit 22 to continue the scroll display to the window (12) which is the final window in a series of the images 60, and then to statically display the window (12).

In case that the selection of the section replay is received, the CPU 11 instructs the display unit 22 to sequentially display only the section between the window (3) and the window (6) in a series of the images 60 and then statically display the window (6) by stopping the scroll. In case that the user wants to scroll the windows, the user carries out a new flick operation.

In case that the second option (continuous display) is selected, the CPU 11 continues the display process for a series of the images 60 by deleting the process selecting window 70. For example, in case that the process selecting window 70 is displayed so as to be overlapped with a series of the images 60 when the window (8) is displayed, the CPU 11 deletes the process selecting window 70 and instructs the display unit 22 to restart the sequential display (scroll display) of a series of the images 60 from the window (8).

In case that the third option (subsequent replay) is selected, the CPU 11 deletes the process selecting window 70 and continues the display process for a series of the images 60. Further, the CPU 11 instructs the display unit 22 to display the execution button for executing the replay process on a part of the display area of the display unit 22 (for example, the upper left corner of the display area). When the execution button is pressed (P4 in FIG. 4), the CPU 11 instructs the display unit 22 to display the replay type selecting window 80 for receiving the selection for executing one type replay between the normal replay and the section replay. The subsequent operation for the third option is the same as the operation which is carried out after and the first option is selected and the replay type selecting window 80 is displayed.

The first information may be optional information as long as the information can specify the position of the image which is displayed on the display unit 22 when the operator removes the operator's gaze from the display unit 22 (the position of the displayed image in a series of the images 60). For example, one or more types of the information can be used among the following information (1) to (4).

(1) The information which specifies the image displayed on the display unit 22 when the operator removes the operator's gaze from the display unit 22 (for example, the window number).

If the window can be specified by the window number or the like, the position of the displayed window in a series of the images 60 can be specified.

(2) The information which specifies the object viewed by the operator in the image which is displayed on the display unit 22 just before the operator removes the operator's gaze from the display unit 22.

For example, the object includes a specific operation button and a specific mark in the image and a specific message in the image. In case that the object, such as the operation button, the message or the like, is unique to the image, the window which is displayed on the display unit 22 when the operator removes the operator's gaze from the display unit 22, can be specified by specifying the above object.

(3) The information which specifies the sound output with the image displayed on the display unit 22 when the operator removes the operator's gaze from the display unit 22.

In case that the sound output with the image is varied, the image displayed on the display unit 22 when the sound is output can be specified in accordance with the output sound.

(4) The time information which specifies the time period from the starting of the sequential display of a series of the images until the removal of the operator's gaze from the display unit 22.

In accordance with the replay speed of a series of the images 60 and the information indicating the time elapsing since the starting of the replay of a series of the images 60, the position of the image in a series of the images 60, which is displayed on the display unit 22 when the operator removes the operator's gaze from the display unit 22, can be specified.

The second information may be optional information as long as the information can specify the position of the image which is displayed on the display unit 22 when the operator returns the operator's gaze to the display unit 22 (the position of the displayed image in a series of the images 60). For example, one or more types of the information can be used among the following information (5) to (8).

(5) The information which specifies the image displayed on the display unit 22 when the operator returns the operator's gaze to the display unit 22 (for example, the window number).

(6) The information which specifies the object viewed by the operator in the image which is displayed on the display unit 22 when the operator returns the operator's gaze to the display unit 22.

(7) The information which specifies the sound output with the image displayed on the display unit 22 when the operator returns the operator's gaze to the display unit 22.

(8) The time information which specifies the time period from the starting of the dynamic display of a series of the images or from the removal of the operator's gaze from the display unit 22 until the return of the operator's gaze to the display unit 22.

In accordance with the replay speed of a series of images and the time period from the starting of the sequential display of a series of images until the return of the operator's gaze to the display unit 22, it is possible to specify the image which is displayed on the display unit 22 when the operator returns the operator's gaze to the display unit 22. Further, in accordance with the first information, it is possible to recognize the position of the image displayed on the display unit 22 when the operator removes the operator's gaze from the display unit 22. Therefore, if the time period from the removal of the operator's gaze from the display unit 22 until the return of the operator's gaze to the display unit 22 is grasped, it is possible to specify the position of the image which is displayed on the display unit 22 when the operator returns the operator's gaze to the display unit 22 (the position of the displayed image in a series of the images 60).

Next, the detail of the process to be carried out by the image processing apparatus 10 when a series of the images are sequentially displayed on the display unit 22, will be explained.

Figure 5:
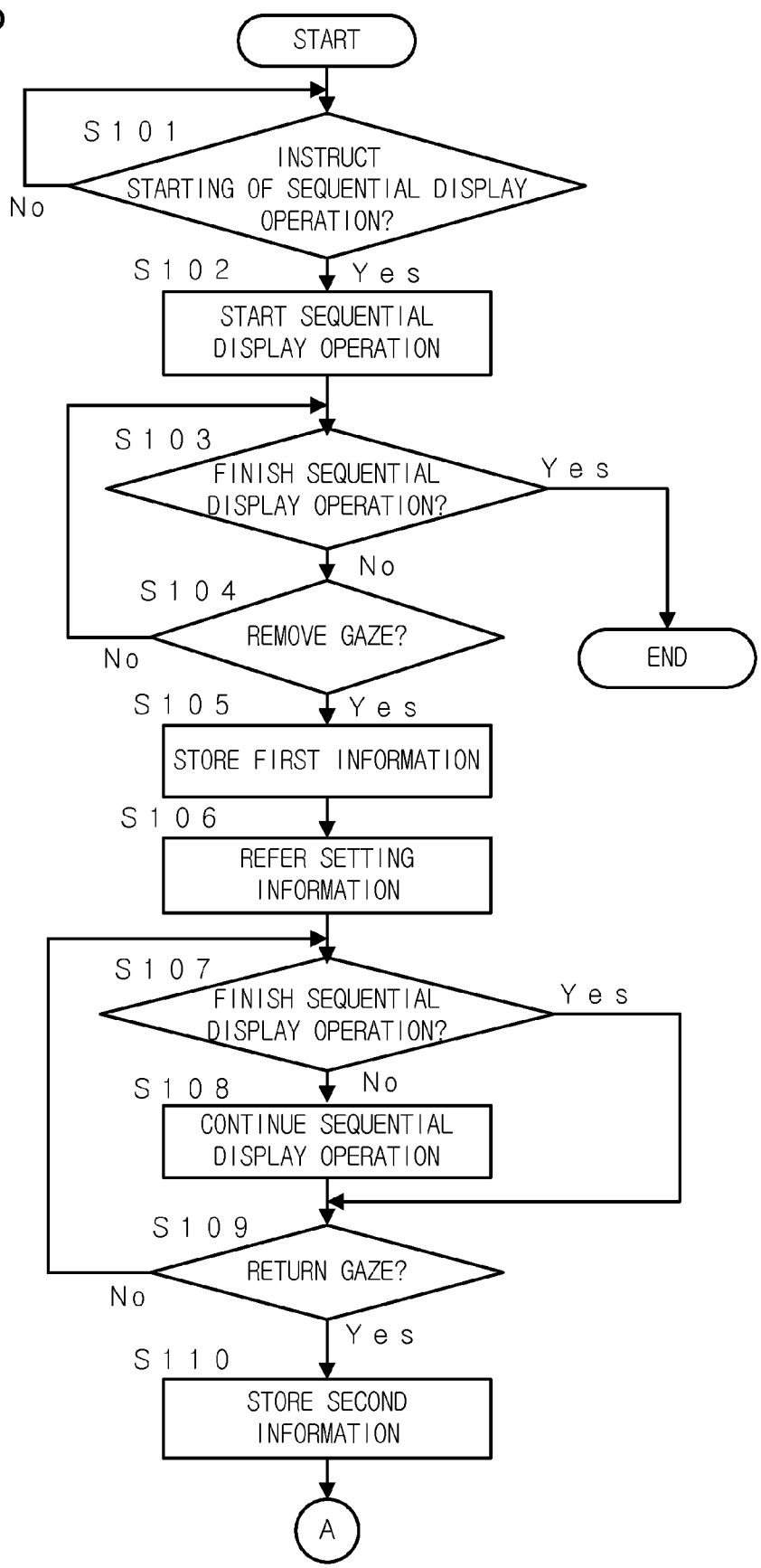

FIGS. 5 and 6 are a flowchart showing the main process carried out by the image processing apparatus 10 when a series of the images are sequentially displayed on the display unit 22. The CPU 11 executes the programs stored in the ROM 12 or the like to realize the process shown in FIGS. 5 and 6.

The image processing apparatus 10 waits for the reception of the starting instruction for starting the operation for sequentially displaying a series of the images (hereinafter, referred to as the sequential display operation), from the user (Step S101). The starting instruction is not limited to the above-described flick operation. In case that a series of the images are a plurality of windows to be transited in the fixed transit order, the staring instruction corresponds to the operation for instructing the window transition. In case that a series of the images are a video, the starting instruction corresponds to the operation for instructing the replay of the video. In case that a series of the images are windows which are sequentially updated in the predetermined order, the starting instruction corresponds to the operation for instructing the starting of the update.

When the starting instruction for starting the sequential display operation is received (Step S101; Yes), the sequential display operation for a series of the images, which corresponds to the received starting instruction is started (Step S102).

When the sequential display operation for a series of the images is finished without removing the operator's gaze from the display unit 22 (Step S104; No) from the starting of the sequential display operation for a series of the images (Step S103; Yes), the main process is ended.

In case that the removal of the operator's gaze from the display unit 22 is detected by the gaze detection unit 28 while the sequential display operation for a series of the images is carried out (Step S104; Yes), the CPU 11 obtains the first information specifying the position of the image in a series of the images, which is displayed on the display unit 22 at the timing of the above detection, and stores the obtained first information in the management table 17 (Step S105). The sequential display operation is continued.

Next, the CPU 11 refers various types of setting information stored in the nonvolatile memory 14. The setting information is information indicating various types of setting contents relating to the replay process. For example, the setting information includes the threshold value relating to the period of the removal of the operator's gaze, and the like. Various types of setting information are set by using a setting window which is not shown in the drawings.

In case that the sequential display operation for a series of the images is not finished (Step S107; No), while the sequential display operation for a series of the images is continued (Step S108), the image processing apparatus 10 waits for the return of the operator's gaze to the display unit 22 (Step S109; No). In case that the sequential display operation for a series of the images is finished before the operator returns the operator's gaze to the display unit 22 (Step S107; Yes), the image processing apparatus 10 maintains the display state of the display unit 22 at the end of the sequential display operation, and waits for the return of the operator's gaze to the display unit 22 (Step S109; No).

When the return of the operator's gaze to the display unit 22 is detected by the gaze detection unit 28 (Step S109; Yes), the CPU 11 obtains the second information specifying the position of the image in a series of the images, which is displayed on the display unit 22 at the timing of the above detection, and stores the obtained second information in the management table 17 so as to relate the second information to the first information stored in Step S105 (Step S110).

In the flowchart shown in FIG. 6, the image processing apparatus 10 refers the first information and the second information (Step S111). Then, the image processing apparatus 10 recognizes the period of the removal of the operator's gaze from the display unit 22 and collects various types of information relating to the images displayed on the display unit 22 during the recognized period. For example, the image processing apparatus 10 collects the period (time) of the removal of the operator's gaze from the display unit 22, the number of windows displayed on the display unit 22 during the above period, the number of objects displayed during the period, the number of operation buttons displayed during the period, the number of characters displayed during the period, the number of alphanumeric characters displayed during the period, and the like (Step S112).

Next, the CPU 11 of the image processing apparatus 10 judges whether the period of the removal of the operator's gaze from the display unit 22, that is, the time period which elapses since the gaze detection unit 28 detects that the user who views the display unit 22 removes the operator's gaze from the display unit 22 until the gaze detection unit 28 detects that the user returns the operator's gaze to the display unit 22 while a series of the images are sequentially displayed, is longer than the threshold value which is previously set (Step S113). The threshold value is set to the general upper limit of the time period in which the operator looks away in case that the operator inadvertently removes the user's gaze from the display unit, for example, 10 seconds. In case that the period of the removal of the operator's gaze from the display unit 22 is longer than the threshold value (Step S113; Yes), the CPU 11 judges that the replay process is not executed, and executes the continuous display process (Step S120). Then, the main process is ended. The continuous display process is the same as the display process which is executed in case that the above second option (continuous display) is selected. In the continuous display process, the display process for the currently displayed window is continued.

In case that the operator inadvertently removes the operator's gaze from the display unit 22 due to the Cause 1, it is thought that the operator returns the operator's gaze to the display unit 22 for a short time. On the other hand, in case that the operator intentionally removes the operator's gaze from the display unit 22 due to the Cause 2, it is thought that the operator removes the operator's gaze from the display unit 22 for a long time as compared with the Cause 1. Therefore, in case that the period of the removal of the operator's gaze from the display unit 22 is longer than the threshold value, the image processing apparatus 10 automatically selects the continuous display process. Because the sequential display operation for a series of the images is continued without returning to the contents which are displayed when the operator removes the operator's gaze, the windows can be displayed so as to match the operator's intention that the windows are simply transited.

In case that the period of the removal of the operator's gaze from the display unit 22 is not longer than the threshold value (Step S113; No), the image processing apparatus 10 displays the information collected in Step S112 (Step S114). Further, the CPU 11 provides the first option, the second option and the third option which are described above, by instructing the display unit 22 to display the process selecting window 70 for receiving the selection for the above options from the operator (Step S115), and waits for the selection operation from the operator (Step S116; No).

FIG. 7 shows an example of the process selecting window 70. In the process selecting window 70, various types of information collected in Step S112 are displayed. Further, the selection button 72 for selecting the first option (immediate replay), the selection button 73 for selecting the second option (continuous display) and the selection button 74 for selecting the third option (subsequent replay) are displayed below the collected information. In each selection button 72 to 74 of the process selecting window 70, the guidance message for indicating the contents of the corresponding display process which is executed when the selection button is selected, is displayed.

When the selection operation for selecting any one option is received from the operator (Step S116; Yes), the CPU 11 executes the display process corresponding to the selected option. In detail, in case that the first option (immediate replay) is selected (Step S117; Immediate), the immediate replay process (Step S118) is executed and the main process is ended. In case that the second option (continuous display) is selected (Step S117; Continuous), the continuous display process (Step S120) is executed and the main process is ended. In case that the third option (subsequent replay) is selected (Step S117; Subsequent), the subsequent replay process (Step 3119) is executed and the main process is ended.

FIG. 8 is a flowchart showing the detail of the immediate replay process (Step S118 in FIG. 6). The CPU 11 realizes the process shown in the flowchart of FIG. 8 by executing the programs stored in the ROM 12 or the like.

Firstly, the CPU 11 returns a series of the images to the replay position which is the window displayed when the operator removes the operator's gaze from the display unit 22, in accordance with the first information referred in Step S111 of FIG. 6 (Step S201).

Next, the CPU 11 informs the operator that a series of the images are returned to the replay position at the time that the operator removes the operator's gaze (Step S202). Then, the replay type selecting window 80 for receiving the selection for selecting one type between the normal replay and section replay, is displayed (Step S203). The image processing apparatus 10 waits for the selection operation for selecting one type between the normal replay and the section replay (Step S204; No).

FIG. 9 shows an example of the replay type selecting window 80. In the replay type selecting window 80, various types of information 81 collected in Step S112 are displayed like the process selecting window 70. Further, the normal replay button 82 and the section replay button 83 are displayed below the information 81. In each of the normal replay button 82 and the section replay button 83, the guidance message for indicating the contents of the corresponding display process which is executed when the selection button is selected, is displayed.

The selection operation for selecting one of the normal replay and the section replay is received from the operator (Step S204; Yes). In case that the selected option is the normal replay (Step S205; Yes), the CPU 11 executes the normal replay (Step S206). That is, the sequential display operation for a series of the images is executed from the window which is displayed when the operator removes the operator's gaze (the replay position). In case the section replay is selected (Step S205; No), the CPU 11 executes the section replay (Step S207). That is, only the section between the window which is displayed when the operator removes the operator's gaze and the window which is displayed when the operator returns the operator's gaze in a series of the images, is sequentially displayed and the window transition is stopped at the window which is displayed when the operator returns the operator's gaze (Step S207).

After Step S206 or Step S207, the CPU 11 deletes the first information and the second information from the management table 17 (Step S208). The immediate replay process is ended (Return).

Figure 10:
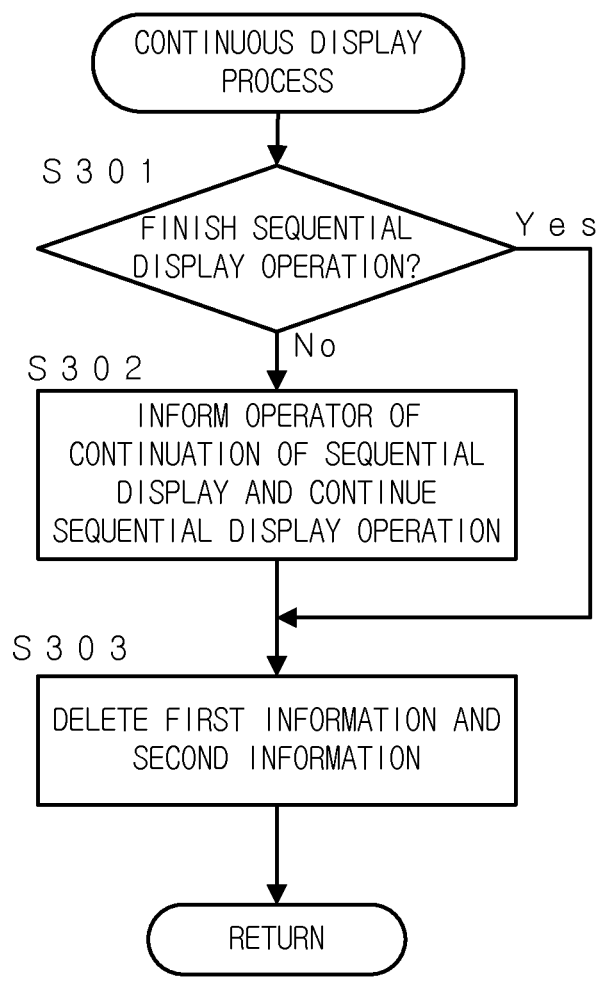
FIG. 10 is a flowchart showing the detail of the continuous display process (Step S120 in FIG. 6)

FIG. 10 is a flowchart showing the detail of the continuous display process (Step S120 in FIG. 6). The CPU 11 realizes the process shown in the flowchart of FIG. 10 by executing the programs stored in the ROM 12 or the like.

In case that the sequential display operation for a series of the images is finished (Step S301; Yes), the CPU 11 deletes the first information and the second information from the management table 17 (Step S303). The continuous display process is ended (Return).

In case that the sequential display operation for a series of the images is not finished (Step S301; No), the CPU 11 informs the operator that the sequential display operation for a series of the images is continued, by displaying the message or the like, and continues the sequential display operation (Step S302). Then, the CPU 11 deletes the first information and the second information from the management table 17 (Step S303). The continuous display process is ended (Return).

Figure 11:
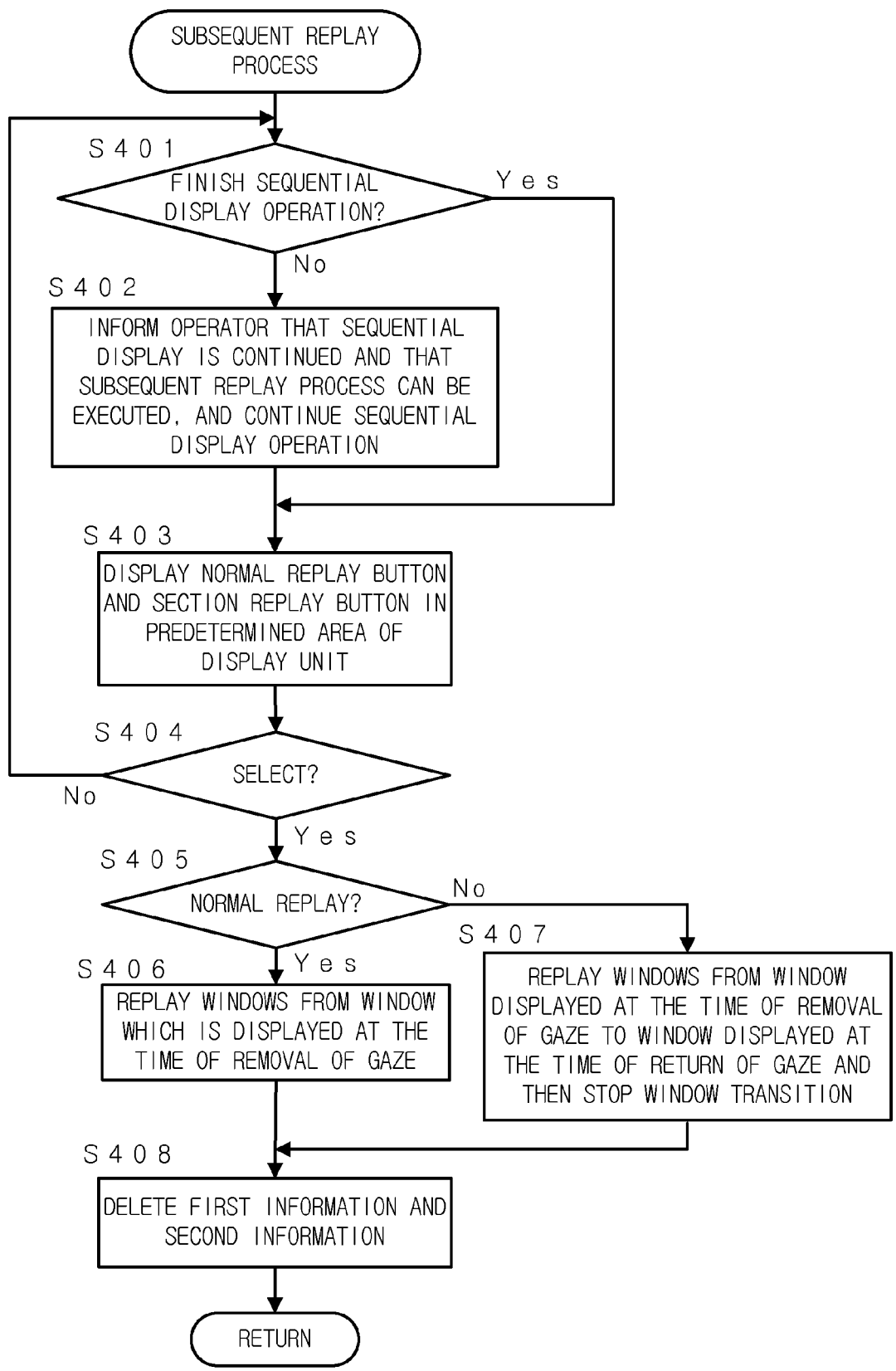
FIG. 11 is a flowchart showing the subsequent replay process (Step S119 in FIG. 6).

FIG. 11 is a flowchart showing the detail of the subsequent replay process (Step S119 in FIG. 6). The CPU 11 realizes the process shown in the flowchart of FIG. 11 by executing the programs stored in the ROM 12 or the like.

The image processing apparatus 10 checks whether the sequential display operation for a series of the images is finished (Step S401). In case that the sequential display operation for a series of the images is not finished (Step S401; No), the CPU 11 informs the operator that the process for the currently displayed window is continued (the sequential display operation for a series of the images is continued) and that the subsequent replay process can be executed, by displaying the message or the like on the display unit 22. Then, the CPU 11 continues the process for the currently displayed window (Step S402). The subsequent replay process proceeds to Step S403.

In case that the sequential display operation for a series of the images is finished (Step S401; Yes), the subsequent replay process proceeds to Step S403. In Step S403, the operation button for instructing the execution of the normal replay and the operation button for instructing the execution of the section replay are displayed in the predetermined display area of the display unit 22. Then, the image processing apparatus 10 waits for the reception of the operation for selecting one of the above operation buttons (Step S404; No).

The execution button for executing the replay process may be displayed in the predetermined area of the display unit 22. When the execution button is operated, the selection operation for selecting one type between the normal replay and the section replay may be received.

The image processing apparatus 10 receives the operation for one of the operation button for instructing the execution of the normal replay and the operation button for instructing the execution of the section replay, from the operator (Step S404; Yes). In case that the operation is the instruction for executing the normal replay (Step S405; Yes), the CPU 11 executes the normal replay (Step S406). That is, the CPU 11 executes the replay process (sequential display) for a series of the images from the window which is displayed when the operator removes the operator's gaze (replay position) (Step S406).

In case that the operation is the instruction for executing the section replay (Step S405; No), the CPU 11 executes the section replay (Step S407). That is, the CPU 11 instructs the display unit 22 to sequentially display only the section between the window which is displayed when the operator removes the operator's gaze and the window which is displayed when the operator returns the operator's gaze and to stop the window transition at the window which is displayed when the operator returns the operator's gaze (Step S407).

After Step S406 or Step S407, the CPU 11 deletes the first information and the second information from the management table 17 (Step S408). The subsequent replay process is ended (Return).

As described above, in the image processing apparatus 10 according to the embodiment, in case that the operator removes the operator's gaze while a series of the images are sequentially displayed, the replay position in a series of the images at the time that the operator's gaze is removed is stored as the first information and the sequential display operation is continued. In case that the operator returns the operator's gaze to the display unit 22, the display process is selected between the return of a series of the images to the window displayed when the operator removes the operator's gaze and the continuation of the current display process. Therefore, it is possible to switch the contents of the display process which is executed after the operator returns the operator's gaze, according to the cause to remove the operator's gaze.

That is, it is possible to select the process which is suitable for the case in which the operator inadvertently removes the operator's gaze for any reason (Cause 1) or the process which is suitable for the case in which the operator intentionally removes the operator's gaze (Cause 2). Therefore, regardless of whether the cause to remove the operator's gaze is the Cause 1 or the Cause 2, it is possible to execute the process which is suitable for each case.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, in Step S113 of FIG. 6, in case that the period of the removal of the operator's gaze is longer than the threshold value, the continuous display process is executed. However, when the options displayed in Step S115 are provided for the operator by using the process selecting window 70, the contents of the message, each size and the like of the selection buttons may be changed according to the period of the removal of the operator's gaze. For example, in case that the period of the removal of the operator's gaze is longer than the threshold value, the message for recommending the continuous display process is displayed or the selection button 73 for selecting the second option (continuous display) is displayed more largely than the other selection buttons.

In this embodiment, in the process selecting window 70, all of the selection button 72 for selecting the first option (immediate replay), the selection button 73 for selecting the second option (continuous display) and the selection button 74 for selecting the third option (subsequent replay) are displayed. However, at least two selection buttons among the above three selection buttons may be displayed to prompt the operator to select the option.

In this embodiment, the image processing apparatus 10 is a multi-function peripheral. However, in case that an apparatus comprises the image processing unit and the display device for displaying the windows relating to the setting of jobs which are executed by the image processing unit, the technology disclosed in this embodiment can be applied to the above apparatus, such as a copy machine, a printer or the like.

Further, as the display device, the operation display device 40 for remotely operating the image processing apparatus 10 is exemplified. However, the display device may be also another type of display device. For example, the display device may be a device for replaying a video, or the like.

One of the objects of the above embodiment is to provide a display device, a non-transitory computer-readable recording medium and an image processing apparatus which can select and execute the process according to the cause to remove the user's gaze in case that the user removes the user's gaze from the display unit during the window transition or the replay of the video.

In this embodiment, in case that the user removes the user's gaze from the display unit while a series of the images are sequentially displayed, the first information specifying the position of the image in a series of the images, which is displayed when the user removes the user's gaze is stored and the sequential display of a series of the images is continued. Then, when the user returns the user's gaze to the display unit, it is judged whether a series of the images are replayed by returning to the replay position specified in the first information. The display process corresponding to the above judgment result is executed. Therefore, it is possible to execute the process which is suitable for each of the case in which the user wants to view the images displayed during the removal of the user's gaze and the case in which the user does not want to view the above images. A series of the images include a video, a plurality of images which are transited in the fixed transit order, and the like.

In this embodiment, when the predetermined operation is received from the user, the sequential display of a series of the images is started.

In this embodiment, when the user returns the user's gaze to the display unit, the second information specifying the position of the image in a series of the images, which is displayed when the user returns the user's gaze is stored. In case that the replay process is executed, only the section in a series of the images, which is displayed while the user removes the user's gaze, is sequentially displayed.

In the embodiment, in accordance with the period of the removal of the user's gaze, it is automatically judged whether the replay process is executed.

According to the display device, the non-transitory computer-readable recording medium and the image processing apparatus, in case that the user removes the user's gaze from the display unit during the window transition or the replay of the video, it is possible to select and execute the process according to the cause to remove the user's gaze.

The present U.S. patent application claims the priority of Japanese Patent Application No. 2013-163424, filed on Aug. 6, 2013, according to the Paris Convention, and the entirety of which is incorporated herein by reference for correction of incorrect translation.

What is claimed is:

1. A display device, comprising:
a display unit;
a gaze detection unit configured to detect a gaze of a user who views the display unit; and
a processor configured to control a display of a series of images on the display unit so that:
in response to the gaze detection unit detecting that the user who is viewing the display unit removes the user's gaze from the display unit while the series of images are sequentially displayed on the display unit, the processor obtains and stores first information specifying a position of an image in the series of images, which is the image last gazed at by the user before the gaze detection unit detects that the user removes the user's gaze, and the display unit continues a dynamic display of the series of images, and
in response to the gaze detection unit detecting that the user returns the user's gaze to the display unit, a judgment is made as to whether the control unit executes a replay process for sequentially displaying the series of images from the position specified in the first information or execute another display process other than the replay process, and
when it is judged the replay process is to be executed rather than the another display process, the processor executes the replay process.

2. The display device of claim 1, further comprising:
an operating unit configured to receive an operation from the user,
wherein in case that a predetermined operation is received by the operating unit from the user, the processor instructs the display unit to start the dynamic display of the series of images.

3. The display device of claim 2, wherein the predetermined operation includes an operation for instructing a window transition in case that the series of images are a plurality of windows to be transited in a fixed transit order, an operation for instructing an update of windows, and an operation for instructing a replay of a video in case that the series of images are the video.

4. The display device of claim 1, wherein the processor obtains and stores second information specifying a position of an image in the series of images, which is displayed on the display unit when the gaze detection unit detects that the user returns the user's gaze to the display unit, and
in the replay process, the processor instructs the display unit to sequentially display only a section between the position specified in the first information and the position specified in the second information in the series of images.

5. The display device of claim 1, wherein the judgment is made in accordance with a period which elapses since the gaze detection unit detects that the user who views the display unit removes the user's gaze from the display unit until the gaze detection unit detects that the user returns the user's gaze to the display unit while the series of images are sequentially displayed.

6. The display device of claim 1, wherein the first information is at least one type of information among:
information which specifies the image displayed on the display unit when the user removes the user's gaze from the display unit;
information which specifies an object viewed by the user in the image which is displayed on the display unit just before the user removes the user's gaze from the display unit;
information which specifies a sound output with the image displayed on the display unit when the user removes the user's gaze from the display unit; and
time information which specifies a time period elapsing since the dynamic display of the series of images is started until the user removes the user's gaze from the display unit.

7. The display device of claim 4, wherein the second information is at least one type of information among:
information which specifies the image displayed on the display unit when the user returns the user's gaze to the display unit;
information which specifies an object viewed by the user in the image which is displayed when the user returns the user's gaze to the display unit;
information which specifies a sound output with the image displayed on the display unit on the display unit when the user returns the user's gaze to the display unit; and
time information which specifies a time period elapsing since the dynamic display of the series of images is started or since the user removes the user's gaze from the display unit until the user returns the user's gaze to the display unit.

8. The display device of claim 1 wherein the judgment is made in accordance with user's selection, and as options for the user's selection, the processor provides at least two options among a first option for immediately executing the replay process, a second option for continuing a current display process and for subsequently executing the replay process, and a third option for continuing the current display process without executing the replay process.

9. A non-transitory computer-readable recording medium storing a program, wherein the program causes an information processing apparatus comprising a display unit and a gaze detection unit configured to detect a gaze of a user who views the display unit, to function as the display device of claim 1.

10. An image processing apparatus, comprising:
an image processing unit; and
the display device of claim 1,
wherein the display device displays a window for setting a job which is executed by the image processing unit.

11. An image processing apparatus, comprising:
an image processing unit; and
the display device of claim 1,
wherein the display device displays a window for setting a job which is executed by the image processing unit, and the display device is connected to the image processing device via a network for remotely controlling the image processing apparatus.

* * * * *